United States Patent

Ogura et al.

[11] Patent Number: 5,994,481
[45] Date of Patent: Nov. 30, 1999

[54] POLYMERIZATION METHOD AND POLYMERIZATION APPARATUS

[75] Inventors: Tohru Ogura; Fumiyuki Suzuki; Yoshifumi Waki, all of Shizuoka, Japan

[73] Assignee: Fuji Photo Film Co., Ltd., Kanagawa, Japan

[21] Appl. No.: 09/032,043

[22] Filed: Feb. 27, 1998

[30] Foreign Application Priority Data

Feb. 28, 1997 [JP] Japan ..................... 9-045999

[51] Int. Cl.$^6$ ............... C08F 2/00; C08G 85/00
[52] U.S. Cl. ............... 526/59; 526/60; 526/61; 526/64
[58] Field of Search ............... 526/59, 60, 61, 526/64; 522/3

[56] References Cited

U.S. PATENT DOCUMENTS

| | | | |
|---|---|---|---|
| 5,312,556 | 5/1994 | Chung et al. | 252/51.5 |
| 5,401,427 | 3/1995 | Chung et al. | 252/56 R |
| 5,552,068 | 9/1996 | Griffith | 508/436 |
| 5,691,283 | 11/1997 | Poat et al. | 508/186 |

FOREIGN PATENT DOCUMENTS 53-2433   2/1976   Japan .

*Primary Examiner*—Samuel A. Acquah
*Attorney, Agent, or Firm*—Sughrue, Mion, Zinn, Macpeak & Seas, PLLC

[57] ABSTRACT

In a polymerization apparatus in which the power of a motor is transmitted to a stirrer via oil-lubricated transmission box and speed reduction gear, the temperature of the lubricating oil in the transmission box and speed reduction gear is maintained constant by means of a heat exchanger, the torque between the motor and the transmission box or the speed reduction gear is measured with a torque meter, the viscosity of a reaction mixture is calculated from the measured torque and the number of rotation of the stirrer, and the stirrer is kept revolving until the calculated viscosity of the reaction mixture reaches a prescribed value.

6 Claims, 3 Drawing Sheets

POLYMERIZATION METHOD AND POLYMERIZATION APPARATUS

BACKGROUND OF THE INVENTION

1. Field of the Invention

This invention relates to a polymerization method for producing polymers such as polyesters and a apparatus used therefor.

2. Description of the Related Art

In production of polymers, it is a common practice to measure the viscosity of the reaction mixture so that the progress of the reaction is estimated from this viscosity to control the reaction. For example, part of the reaction mixture is taken from a reaction vessel and sent to a viscometer consisting of a constant delivery pump and a capillary, where the measured differential pressure is converted to a viscosity, and the process is controlled based on the thus determined viscosity.

In a rotary polymerization apparatus, the process could be monitored by measuring the viscosity of a sample of the reaction mixture as in a continuous production apparatus, but such is not practical taking into account the time lag, change-over of the species to be produced, cleaning of the reaction vessel, and the like. Instead, the process control is usually effected by detecting the load imposed on the stirrer in the reaction vessel and calculating the viscosity of the reaction mixture from the load so as to obtain product consistency based on the calculated viscosity.

It is desirable that the load applied to a stirring machine is obtained by measuring the torque on the central shaft of the stirring machine with a torque meter directly attached to the shaft. However, because the size of the torque meter must be increased in proportion to the size of the reaction vessel, i.e., the size of the stirring machine, the positions of fixing equipment onto the polymerization vessel are restricted.

Therefore, it is the load imposed to the rotating motor shaft driving the stirring machine that has been measured to calculate the viscosity of the reaction mixture. Since the load on the motor shaft is smaller than that on the stirring machine itself, the torque meter can be made smaller (see, e.g., Examined Japanese Patent Publication No. Sho. 53-24233).

There being no large torque meter right above the reaction vessel, various pipes, a monitoring window, a hand hole for cleaning, a header for pressure application, and the like can be attached to the reaction vessel at positions easy to handle.

However, the torque measured on the rotating shaft of the motor consists of not only the resistance of the reaction mixture but also, as hereinafter described, the resistance of lubricating oil used in a driving mechanism (a transmission box and a speed reduction gear) which greatly varies depending on the surrounding temperature or the running time, thereby impairing the measurement accuracy.

The viscosity of a lubricating oil widely fluctuates with temperature as shown in FIG. 4. For example, when the outdoor temperature falls to 5° C. or below in winter, the viscosity rises to 1000 cSt or higher. The temperature of the lubricating oil can exceed 80° C. in summer when the transmission box and the speed reduction gear are operated for a long period of time or when a highly viscous reaction mixture is stirred, in which the viscosity of the lubricating oil can drop to 20 cSt or lower.

FIG. 5 depicts the relationship of power loss vs. running time in a transmission box and a speed reduction gear using various lubricating oils a1, a2, b1, b2, c1, and c2, with no load applied with no reaction mixture in a reaction vessel. The power of the motor is 15 kW. It is seen that the power loss is very large in the beginning of stirring irrespective of the kind of the lubricating oil and that more than a half the motor power is consumed by the transmission box and the speed reduction gear. The power loss is reduced with running time, ultimately reaching a stationary state. This is because the temperature of the lubricating oil increases with running time, which reduces the viscosity.

Where several batches are polymerized in a rotary polymerization apparatus using lubricated transmission box and speed reduction gear, a great power loss occurs in the first batch due to the low lubricating oil temperature in the speed reduction gear and transmission box. As a result, cases are sometimes met with, in which the actual viscosity (intrinsic viscosity; hereinafter abbreviated as IV) of the reaction mixture withdrawn from the reaction apparatus is unexpectedly lower than the one calculated from the measured torque on which the operator has made a judgement in deciding when to stop the reaction.

In order to avoid such a situation, it is necessary to reduce the viscosity of the lubricating oil by increasing the lubricating oil temperature by operating the transmission box and speed reduction gear beforehand. However, this method involves waste of time and power.

Because a lubricating oil changes its viscosity between winter and summer, it has also been proposed to use a low-viscosity lubricating oil in winter to reduce a power loss and a high-viscosity lubricating oil in summer to prevent breaking of an oil film.

However, when the reaction is controlled while calculating the viscosity of the reaction mixture from the motor torque measured even with such a measure for power loss reduction being taken, the resulting resin often shows variation of intrinsic viscosity (IV) from batch to batch. Thus, it has been required that the resin from different batches should be blended to level the IV variation, which results in reduction of productivity.

SUMMARY OF THE INVENTION

It is an object of the present invention to provide a polymerization method and a polymerization apparatus capable of obtaining a polymer with constant quality and improved productivity while excluding the influence of viscosity variation of the lubricating oil used in a transmission box and a speed reduction gear and minimizing waste of running time and power.

A polymerization method by stirring a reaction mixture to cause polymerization according to the present invention comprises the steps of: maintaining the lubricating oil used in at least one of an oil-lubricated transmission box and an oil-lubricated speed reduction gear that constitute a driving mechanism for transmitting power of a motor to a stirring machine containing a reaction mixture at a constant temperature to maintain a torque of the driving mechanism constant; calculating a viscosity of the reaction mixture in the stirring machine based on the torque measured between the motor and at least one of the transmission box and the speed reduction gear and the number of rotation of the stirring machine with the measured torque being regarded as a torque generated by the stirring machine; and controlling the polymerization reaction by adjusting the rotation of the stirring machine so that the viscosity of the reaction mixture reaches a prescribed value.

A polymerization apparatus for carrying out polymerization by stirring a reaction mixture, comprises: stirring means for putting a reaction mixture therein and for receiving power from a motor for stirring to achieve polymerization; an oil-lubricated type transmission box and an oil-lubricated type speed reduction gear constituting a driving mechanism for transmitting power from the motor to the stirring means; temperature controlling means for detecting a temperature of the lubricating oil of at least one of the transmission box and speed reduction gear and for maintaining the temperature constant; torque measuring means for measuring a torque between the motor and at least one of the transmission box and speed reduction gear; and stirring controlling means for calculating a viscosity of the reaction mixture in the stirring means based on the measured value from the torque measuring means and the number of rotation of the stirring means and for controlling the rotation of the stirring means so that the viscosity of the reaction mixture reaches a prescribed value.

According to the polymerization method and apparatus of the present invention, since the torque between the motor and at least one of the transmission box or speed reduction gear is measured with the torque generated by the driving mechanism being maintained constant by maintaining the temperature of the lubricating oil of at least one of the transmission box and speed reduction gear constant, the measured torque can be made use of as a reflection of the torque generated by the stirring machine. Thus, the viscosity of the reaction mixture can be calculated based on the number of rotation of the stirring machine and the accurate torque measurement free from the influence of the lubricating oil, thereby making it feasible to control the rotation of the stirring machine for proper polymerization. As a result, product consistency and improved productivity can be obtained while avoiding waste of time and power.

Since the process and quality control according to the present invention are not affected by the kind of the transmission box or speed reduction gear, the freedom of choice of the transmission box or speed reduction gear is broadened, and a torque meter small for the size of the stirring machine can be used.

PREFERRED EMBODIMENTS OF THE INVENTION

Embodiments of the polymerization method and apparatus according to the present invention will be described with referring to the accompanying drawings.

Figure 1:
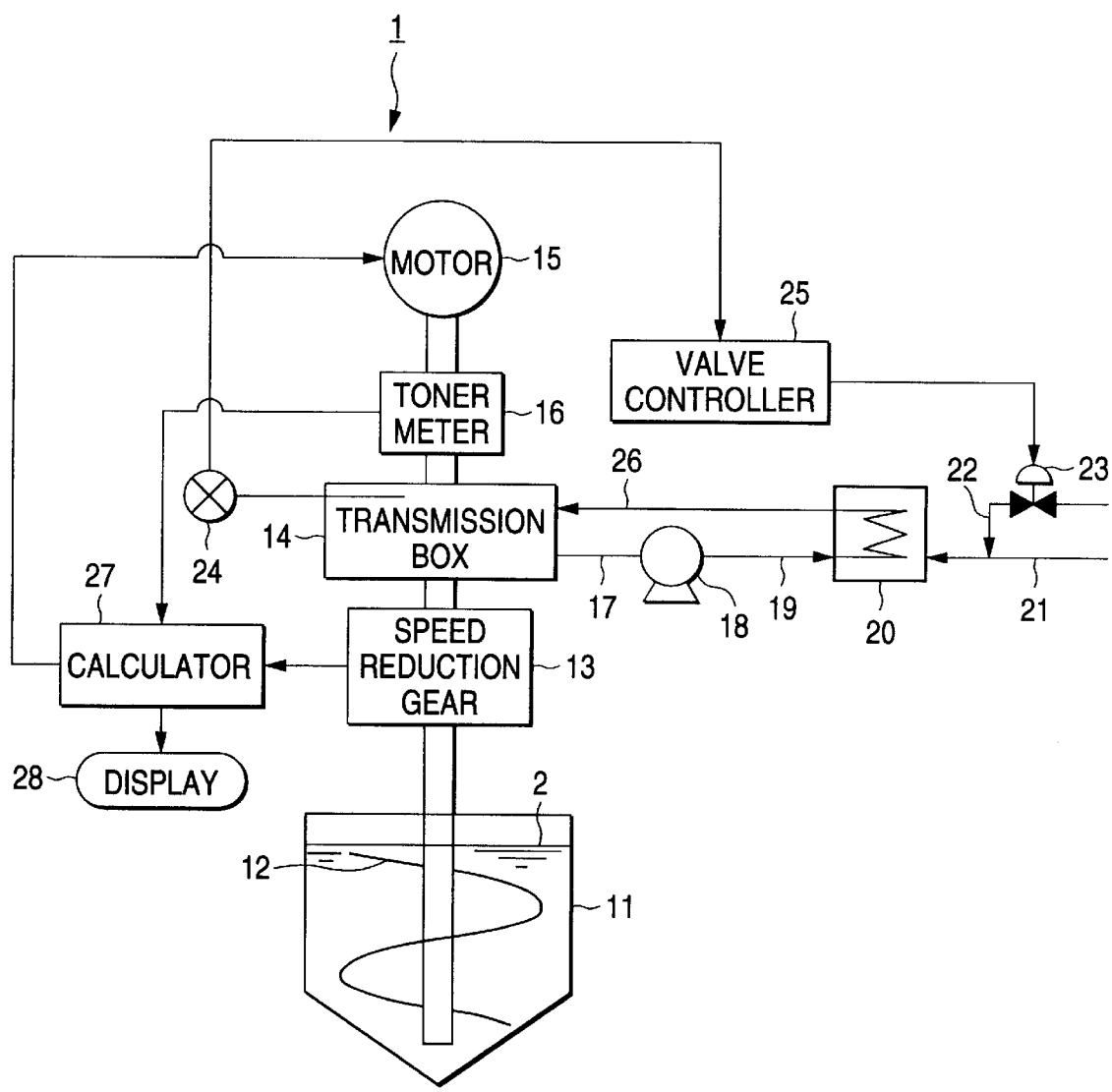
FIG. 1 shows a apparatus to which the present invention is applied.
Figure 2:
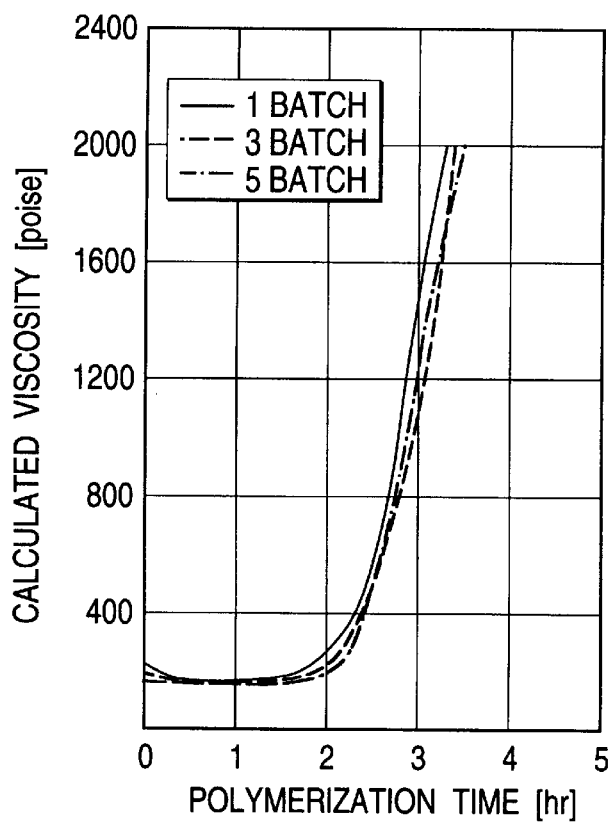
FIGS. 2 and 3 each shows a test result obtained by using the polymerization apparatus of the invention.
Figure 3:
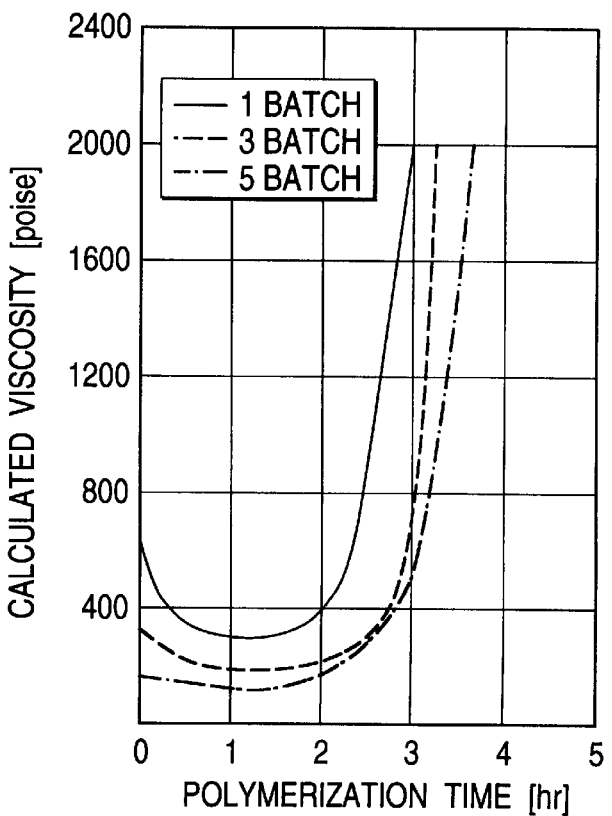
Figure 4:
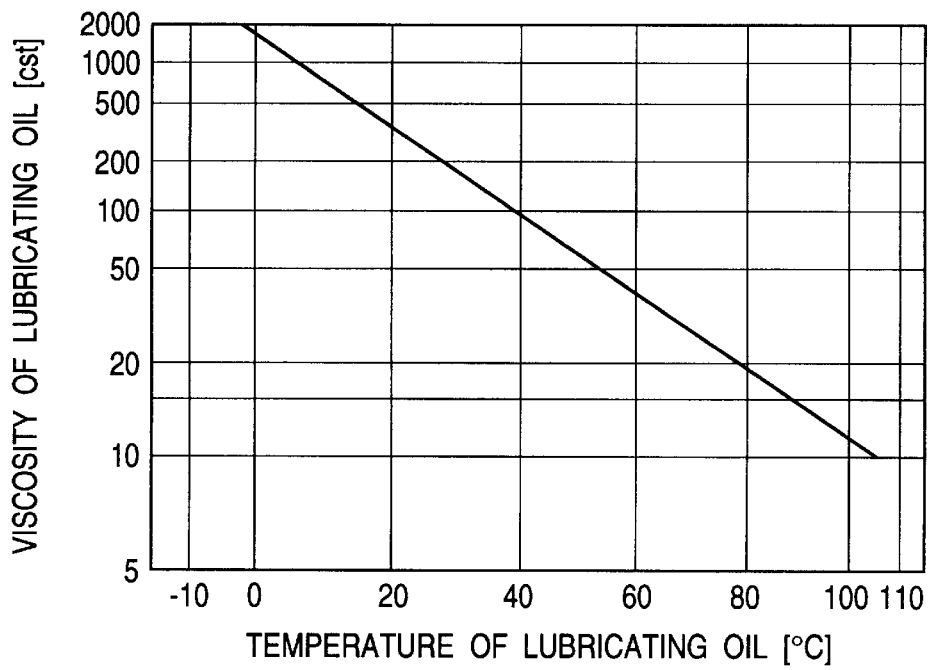
FIG. 4 is a graph representing the characteristics of lubricating oils.
Figure 5:
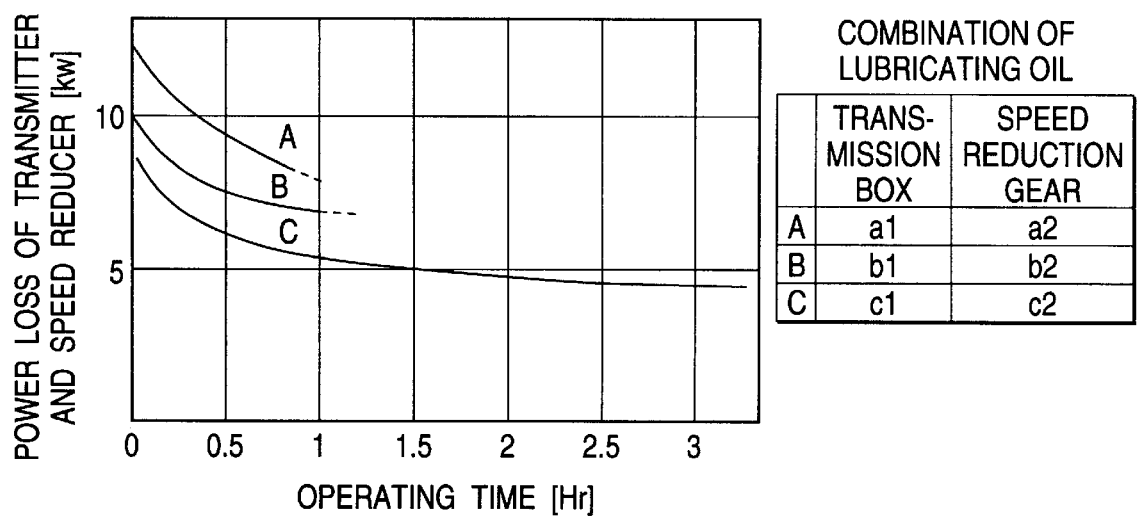
FIG. 5 shows a graph of power loss in a transmission box and a speed reduction gear using various combinations of lubricating oils.

FIG. 1 is a schematic diagram of a polymerization apparatus to which a polymerization method of the invention is applied. FIGS. 2 and 3 each shows a test result obtained by using the polymerization apparatus of the invention.

As shown in FIG. 1, a polymerization apparatus 1 utilizing the method of the invention has a stirrer 12 (double-helical stirrer in this embodiment) in its rotary polymerization vessel 11, by which a reaction mixture 2 is agitated to undergo polymerization.

The stirrer 12 is connected to a motor 15 via oil-lubricated speed reduction gear 13 and transmission box 14. Between the motor 15 and the transmission box 14, a torque meter 16 is attached, with which the torque generated on the rotating shaft of the motor 15 is measured.

A suction port of a pump 18 is connected to the transmission box 14 via a pipe 17. A cooling water pipe 21 and a steam pipe 22 are connected to a heat exchanger 20. The steam pipe 22 has an electrically-operated control valve 23.

A temperature sensor 24 for measuring the temperature of lubricating oil is fitted to the transmission box 14. A valve controller 25 is connected to the temperature sensor 24, and the control valve 23 is controlled by the valve controller 25. The lubricating oil of the transmission box 14 is sent to the heat exchanger 20 through pump 18, where the temperature of the lubricating oil is adjusted. The lubricating oil having a controlled temperature is returned to the transmission box 14 through a pipe 26 and is also circulated to the speed reduction gear 13.

A calculator 27 is connected to both the speed reduction gear 13 and the torque meter 16 so that the reduction ratio of the speed reduction gear 13, the regulating ratio of the transmission box 14, and the torque measured with the torque meter 16 are fed to the calculator 27. The number of rotation of the motor 15 is also supplied to the calculator 27. The calculator 27 calculates the number of rotation of the stirrer 12 based on the number of rotation of the motor 15, the reduction ratio of the speed reduction gear 13 and the regulating ratio of the transmission box 14. Then, the viscosity of the reaction mixture 2 is calculated based on the calculated number of rotation of the stirrer 12 and the torque of the motor 15 in accordance with the following formula. The calculated viscosity $\mu$ is displayed on a display 28.

$$T = k_1 * [(1/\eta_V) * \{(P_{net} + L_M)/\eta_R + L_R\} + L_V]$$
$$P_{net} = (K/Re) * \{(\rho * N^3 * d^5)/(9.8)\}$$
$$= \{(K*\mu)/(\rho*N*d^2)\} * \{(\rho*N^3*d^5)/(9.8)\}$$
$$= \{(\mu*K*N^2*d^3)/(9.8)\}$$
$$[\because Re = \{(\rho*N*d^2)/\mu\}]$$

$\mu$: viscosity of reaction mixture 2
$\rho$: liquid density
N: number of rotation of the wing of stirrer 12
T: torque of motor 15
d: outer diameter of the wing of stirrer 12
Re: Reynolds number
$k_1$: constant
K: constant inherent to the wing of stirrer 12
$\eta_V$: efficiency of transmission box
$\eta_R$: efficiency of speed reduction gear
$L_V$: power loss in transmission box
$L_R$: power loss in speed reduction gear
$L_M$: power loss in shaft seal
$P_{net}$: net shaft power Next, the function of the polymerization apparatus 1 will be described below. In order to carry the polymerization in the polymerization apparatus 1, the motor 15 is turned on to rotate the stirrer 12 via the transmission box 14 and the speed reduction gear 13. The lubricating oil in the transmission box 14 and the speed reduction gear 13 is sent to the heat exchanger 20 by the pump 18. The lubricating oil temperature is maintained constant by supplying cooling water or steam.

In order to feed steam to the heat exchanger 20, the temperature of the lubricating oil in the transmission box 14 and the speed reduction gear 13 are measured at the sensor 24, and the thus read temperature is sent to the valve controller 25. The valve controller 25 controls the degree of opening of the control valve 23 to feed a prescribed amount of steam to the heat exchanger 20 so that the temperature of the lubricating oil may be maintained constant.

In this way, the stirrer 12 is rotated while keeping a constant lubricating oil temperature in the transmission box 14 and the speed reduction gear 13. At the same time, the torque of the rotating shaft of the motor 15 is measured at the torque meter 16, and the measured value is sent to the calculator 27. The ratio of regulation of the transmission box 14, the ratio of reduction of the speed reduction gear 13, and the number of rotation of the motor 15 are also sent to the calculator.

In the calculator 27, N (the number of rotation of the stirrer 12) and T (the torque of the rotating shaft of the motor 15) of the above formula are substituted with the calculated value N and the measured value T to obtain viscosity $\mu$ of the reaction mixture 2, which is displayed on the display 28. The rotation of the stirrer 12 is continued to accelerate the reaction until the viscosity $\mu$ of the reaction mixture 2 reaches a prescribed level.

As stated above, the torque of the rotating shaft of the motor 15 is measured while adjusting the temperature of the lubricating oil in the transmission box 14 and the speed reduction gear 13 at a constant point, the load imposed on the stirrer 12, i.e., the viscosity of the reaction mixture 2 can be calculated accurately without being affected by the temperature of the lubricating oil. Thus, the resulting resin always has a constant viscosity and thereby improved quality.

Further, because the temperature of the lubricating oil can be maintained constant by means of the heat exchanger 20, it is no more necessary to warm the lubricating oil by pre-operating the speed reduction gear 13 and the transmission box 14 for a long time as with the case of a conventional polymerization apparatus, thereby achieving time and power saving.

EXAMPLES

Polyester was produced by the use of the apparatus shown in FIG. 1. The lubricating oil temperature was maintained at 50±1° C., and the viscosity, as calculated, at which the polymerization is to be ceased was set at 2000 poise. Consecutive 5 batches were polymerized, and calculations of the viscosity were made for the 1st, 3rd and 5th batches. The results obtained are shown in FIG. 2. As can be seen from FIG. 2, the rising curves of the calculated viscosity represent reproducibility. The polyester withdrawn from the apparatus had an intrinsic viscosity IV within a narrow range of from 0.661 to 0.671, that is, stable quality.

For comparison, consecutive 5 batches having the same amount and the same composition as used above were polymerized in the same manner as described above, except that the feed of cooling water and steam to the heat exchanger 20 was stopped, and the valve controller 25 was not used. In this case, too, the calculated viscosity at which the polymerization is to be stopped was set at 2000 poise. The viscosity of the reaction mixture was calculated for the 1st, 3rd and 5th batches. As a result, the temperature sensor read 11° C. immediately after the start of the 1st batch, but it stood at 58° C. at the end of the 5th batch. The calculated viscosity curves are shown in FIG. 3. As is apparent from FIG. 3, the intrinsic viscosity IV of the resulting polyester showed large batch-to-batch variations from 0.633 to 0.707, indicating deteriorated product consistency.

While the present invention has been explained with reference to particular application to the polymerization apparatus 1, the present invention is applicable to a polycondensation reaction apparatus or a rotary polycondensation reaction apparatus. While both the transmission box 14 and speed reduction gear 13 are used in the above-illustrated embodiment, the present invention also works where either one of them is used.

As has been described, the torque measured between a motor and a transmission box or a speed reduction gear can be regarded as equal in its change to the torque generated in a stirring machine (i.e., the torque measured directly on a stirrer), provided that the temperature of the lubricating oil used in a transmission box and a speed reduction gear in the driving mechanism is maintained constant thereby to fix the torque generated in the driving mechanism. Accordingly, the torque measured under such a condition can be made use of as an accurate reflection of the torque generated in the stirring machine. That is, the viscosity of a reaction mixture can be calculated from the torque precisely measured with no influence of the lubricating oil and the number of rotation of the stirring machine at the time of torque measurement, and the stirrer rotation can be controlled based on the resulting data for achieving polymerization. This leads to improved productivity and stabilized product quality while minimizing waste of running time and power. In addition, because the process and quality control are not affected by the kind of the transmission box or speed reduction gear, the freedom of choice of the transmission box or speed reduction gear is broadened, and a torque meter small for the size of the stirring machine can be used.

What is claimed is:

1. A polymerization method by stirring a reaction mixture to cause polymerization; comprising the steps of:

maintaining the lubricating oil used in at least one of an oil-lubricated transmission box and an oil-lubricated speed reduction gear that constitute a driving mechanism for transmitting power of a motor to a stirring machine containing a reaction mixture at a constant temperature to maintain a torque of the driving mechanism constant;

calculating a viscosity of the reaction mixture in the stirring machine based on the torque measured between the motor and at least one of the transmission box and the speed reduction gear and the number of rotation of the stirring machine with the measured torque being regarded as a torque generated by the stirring machine; and controlling the polymerization reaction by adjusting the rotation of the stirring machine so that the viscosity of the reaction mixture reaches a prescribed value.

2. A polymerization apparatus for carrying out polymerization by stirring a reaction mixture, comprising:

stirring means for putting a reaction mixture therein and for receiving power from a motor for stirring to achieve polymerization;

at least one of an oil-lubricated type transmission box and an oil-lubricated type speed reduction gear constituting a driving mechanism for transmitting power from the motor to said stirring means;

temperature controlling means for detecting a temperature of the lubricating oil of at least one of said transmission box and speed reduction gear and for maintaining the temperature constant;

torque measuring means for measuring a torque between the motor and at least one of said transmission box and speed reduction gear; and stirring controlling means for calculating a viscosity of the reaction mixture in said stirring means based on the measured value from said torque measuring means and the number of rotation of said stirring means and for controlling the rotation of said stirring means so that the viscosity of the reaction mixture reaches a prescribed value.

3. A polymerization apparatus according to claim 2, wherein said stirring means has a double-helical stirrer.

4. A polymerization apparatus according to claim 2, wherein said temperature controlling means comprises a heat exchanger and pipes which connect said heat exchanger and at least one of said transmission box and said speed reduction gear so that the temperature of the lubricating oil is made constant by said heat exchanger.

5. A polymerization apparatus according to claim 2, wherein said lubricating oil circulates at least one of said transmission box and said speed reduction gear.

6. A polymerization apparatus according to any one of claims 2 to 5, wherein said driving mechanism comprises both said oil-lubricated type transmission box and said oil-lubricated type speed reduction gear.

* * * * *